United States Patent [19]
Owens

[11] 3,827,157
[45] Aug. 6, 1974

[54] ARTIFICIAL-HORIZON GYROSCOPE
[75] Inventor: Frederick J. Owens, Hopatcong, N.J.
[73] Assignee: Aerosonic Corporation, Clearwater, Fla.
[22] Filed: June 16, 1972
[21] Appl. No.: 263,696

[52] U.S. Cl. .............................................. 33/329
[51] Int. Cl. .......................................... G01c 19/44
[58] Field of Search ............................. 33/329, 328

[56] References Cited
UNITED STATES PATENTS

| | | | |
|---|---|---|---|
| 1,980,886 | 11/1934 | Talafre et al. | 33/328 |
| 1,982,636 | 12/1934 | Carlson | 33/329 X |
| 1,982,851 | 12/1934 | Bassett et al. | 33/329 |
| 2,489,294 | 11/1949 | Kenyon | 33/328 |
| 2,515,200 | 7/1950 | Draper | 33/328 |
| 2,747,293 | 5/1956 | Lyons | 33/328 |
| 3,039,200 | 6/1962 | Vibert | 33/328 |

FOREIGN PATENTS OR APPLICATIONS
877,780   9/1942   France .............................. 33/329

Primary Examiner—Robert B. Hull
Attorney, Agent, or Firm—Stein, Orman & Fisher

[57]     ABSTRACT

In an artificial horizon gyroscope, pitch information is transmitted from the gyro rotor pitch axis by means of a belt-and-pulley arrangement and a pin-and-slot connection to the display or indicating dial. A drive wheel carries the pin which engageably rides in the slot in a pitch arm extending through a pivot axis member to the indicating dial.

3 Claims, 3 Drawing Figures

ARTIFICIAL-HORIZON GYROSCOPE

BACKGROUND OF THE INVENTION

In the gyroscopic instrumentation field, and in particular to the horizon or attitude type of instrument, there are two axial components of rotary displacement which must be monitored to maintain accurate control of the aircraft. These are the pitch and the roll components of airframe displacement with respect to a spinning gyro rotor assembly carried in an attitude gimbal. Conventional gyros have incorporated a cantilever-type suspension of the gimbal to compensate for the offset of the pivot axis thereof from the pivot axis of the pitch indicator or dial.

One example of the prior art, which discloses structure and function different from such cantilever-type suspension of the gimbal, utilizes a cam and follower arrangement wherein the gyro rotor carries a cam plate and the pitch arm carries a cam plate, each of the cam plates having followers associated with their respective plates for transmitting pitch motion to the pitch arm and then to the indicating dial.

SUMMARY OF THE INVENTION

The present invention relates to artificial-horizon or attitude-type gyroscopes and more particularly to means for transmitting motion or changes in the pitch of a gyro rotor carrying gimbal to a display or indicating dial. The pitch information is transmitted to the indicating face or dial by means of a pitch arm pivotable in the gimbal frame, with such arm having a slotted connection therein for carrying a pin extending from a drive wheel carried on one end of a shaft journaled in the gimbal of the instrument. The other end of the shaft carries a driven pulley around which a belt is trained, in turn, around another pulley which is connected to the pitch axis pivot shaft of the gimbal.

Any motion or change in the pitch of the gimbal is picked up by the driving pulley on the gimbal and is transmitted through the belt to the driven pulley, in turn, to the drive wheel which changes the attitude of the pin and slot connection to cause deflection of the pitch arm and thereby display such movement to the indicating face or dial. Any motion or change in roll is transmitted to the indicating face of the instrument by a roll index ring secured to an adapter block, in turn, fixed to the hollow roll axis pivot of the gimbal.

In view of the above discussion, the principal object of the present invention is to provide a simple mechanical connection for transmitting pitch attitude from the gimbal to the indicating dial.

Another object of the present invention is to provide an improved horizon gyroscope not requiring a cantilevered gimbal.

A further object of the present invention is to provide an improved horizon gyroscope of rectangular gimbal construction for accurately positioning the attitude of such gimbal.

An additional object of the present invention is to provide a belt and pulley arrangement for transmitting motion of the gimbal to the indicating face.

Additional advantages and features of the present invention will become apparent and fully understood from a reading of the following description taken together with the annexed drawings, in which.

Figure 1:
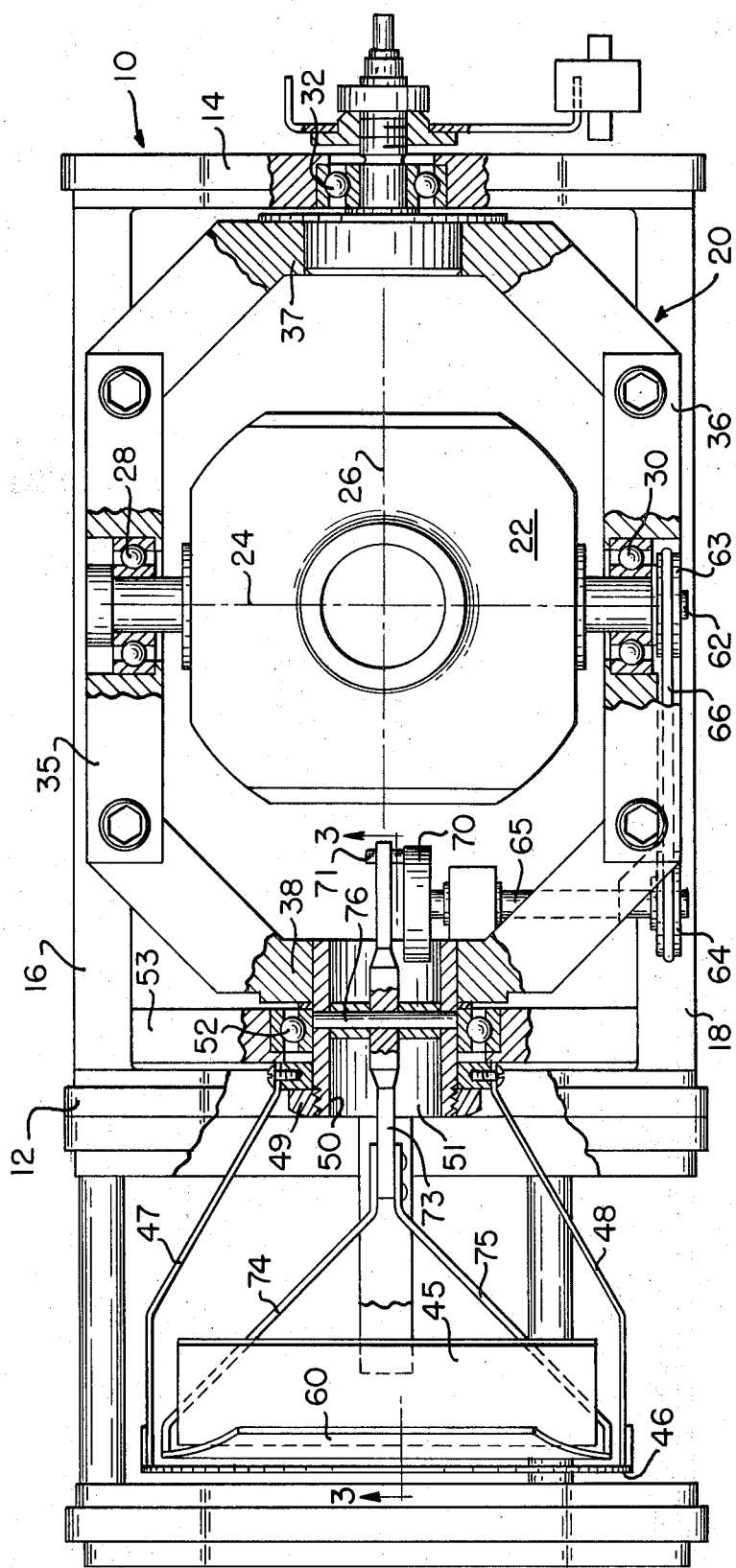
FIG. 1 is a plan view of the mechanism of an artificial-horizon gyroscope incorporating the structure of the present invention, with certain parts being broken away.
Figure 2:
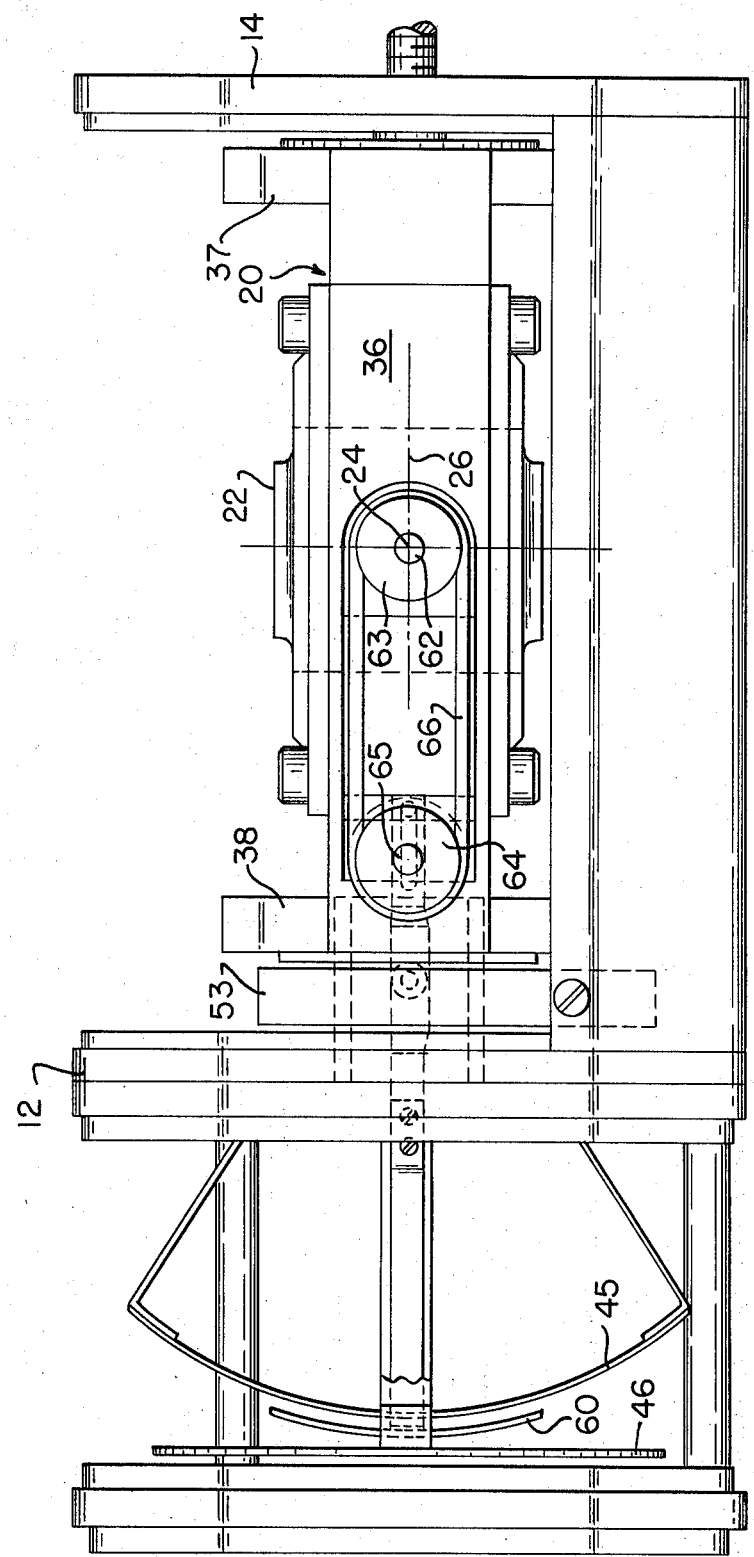
FIG. 2 is a side view of the structure shown in FIG. 1.

Referring now to FIGS. 1 and 2 of the drawings, the gyroscopic instrument is carried by a frame 10 having front 12 and rear 14 support members, and side members 16 and 18 forming an enclosure for a gimbal 20. The gimbal 20 pivotally supports a gyro rotor assembly 22 along a transverse pitch axis 24, with the gimbal itself being pivotally supported along a horizontal roll axis 26. Bearings 28 and 30 (FIG. 1) provide the pivots in gimbal 20 for rotation of the gyro rotor assembly 22 on pitch axis 24, and bearing 32 provides the pivot in rear member 14 for rotation of the gimbal 20 on roll axis 26. The gyro rotor may be a conventional electric or air driven flywheel, enclosed in a housing which is pivotally supported along said pitch axis 24 to sense changes in pitch attitude. For purposes of this invention, the gyro rotor was constructed to be electrically spun by suitable energy supply means, not shown.

Gimbal 20 is generally rectangular in shape for providing the intermediate connection between the gyro rotor assembly 22 and the frame 10, there being longitudinal side members 35 and 36 on opposite sides of and along a plane common to the roll axis 26, and connecting end members 37 and 38 for the members 35 and 36.

Figure 3:
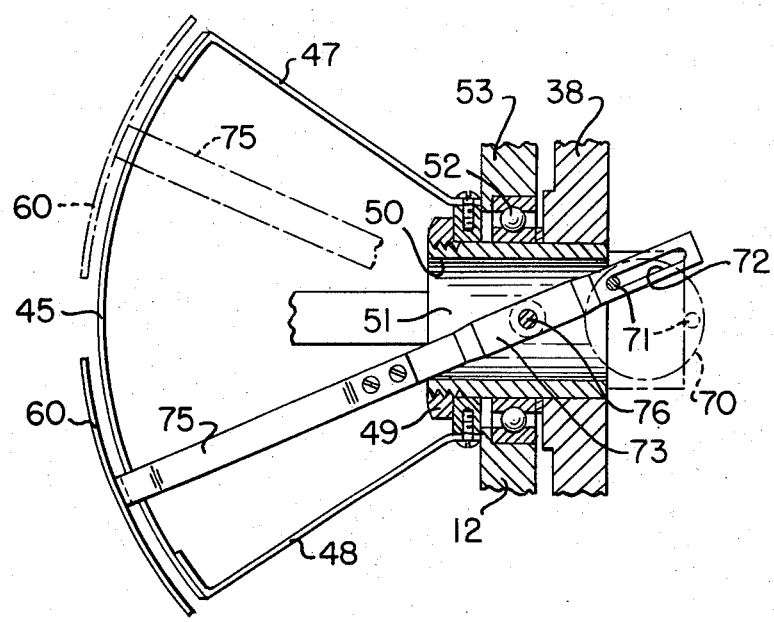
FIG. 3 is a view taken on the plane 3-3 of FIG. 1.

Roll axis 26 information is transmitted to and displayed on the indicating face or mask 45 by means of a conventional roll index ring 46 which is attached by brackets 47 and 48 to an adapter block 49 fixed to a hollow roll axis pivot 50 (see FIGS. 1 and 3). The roll axis pivot 50 has a passageway or bore 51 therethrough for accommodating mechanism to be described. It is herein sufficient to say that roll of the gimbal 20 is directly transmitted along the axis 26, carried on bearing 32 and on a bearing 52 mounted in a plate 53 secured to the side members 16 and 18, and then transmitted to the indicating face 45.

In accordance with a feature of the invention, pitch information is directly and mechanically transmitted from within the gimbal 20 to the display or indicating face 45 of the instrument and being observable as an up-down pivotal displacement of a pitch indicator 60 in relation to the mask 45. The pitch of the aircraft is measured or indicated by reason of the pivotal movement on the pitch axis 24 of the rotor assembly 22 which assembly responds to certain changes in attitude or pitch. The gyro rotor assembly 22 includes a stub shaft 62 extending through the side member 36 of the assembly and has a pulley 63 (see also FIG. 2) keyed to the shaft 62 to turn or rotate therewith. A second pulley 64 is secured to a shaft 65 journaled in an inwardly angling portion of side member 36 forward of the gyro rotor assembly 22, and the shaft 65 extends inwardly toward the roll axis 26, there being a belt 66 trained around and connecting the two pulleys 63 and 64.

The opposite end of the shaft 65 from that of the pulley 64 end has affixed thereto a drive wheel 70 (see also FIG. 3) which carries a pin 71 operating in a slot 72 at one end of a horizon bar arm 73 extending through the hollow pivot 51, the arm 73 being pivotable on a pivot pin 76 carried by the hollow roll axis pivot 50, and connected to the pivot indicating face 60 at the front of the instrument by means of arms 74 and 75. In FIG. 3 is shown one position of the horizon bar arm 73 in full line and a second position in phantom line to indicate the displacement of the arm 73 and the face 60.

It is thus seen that herein shown and described is mechanism for indicating roll and pitch information in an artificial horizon gyroscope, wherein simple mechanical motion of a substantially rectangular gimbal 20 is directly transmitted to the display face 45 of the instrument. The mechanism provides improved support characteristics of the roll gimbal by eliminating the cantilever-type gimbal suspension generally used by the industry. These characteristics include improved shock and vibration resistance, a stronger gimbal construction due to the enclosed rectangular shape as opposed to the U-shape, improved bearing suspension to prevent twisting of the bearing axis, and adaptability to future "outside-in" gyro horizon design.

The apparatus enables the accomplishment of the objects and advantages mentioned above, and while only one embodiment of the invention has been disclosed herein, certain variations may occur to those skilled in the art. It is contemplated that all such variations, not departing from the spirit and scope of the invention hereof, are to be construed in accordance with the following claims.

What is claimed is:

1. In a mechanism for transmitting roll and pitch information in an artificial horizon gyroscope having a frame, an attitude gimbal, and bearing means for suspending said gimbal along a roll axis in said frame, said bearing means including a generally central passageway therethrough, the improvement comprising a
   gyro rotor assembly and bearing means supporting said assembly along a pitch axis in said gimbal,
   means for indicating said roll and pitch information, said means for indicating pitch information including a horizon arm extending through said passageway and having a pivot in said roll axis bearing means and transverse to said passageway, said arm having an elongated slot therein, and
   drive means connected with said gyro rotor assembly and with said indicating means and including a drive member secured to the pitch axis of the gyro rotor assembly and responsive to changes in pitch thereof, a driven member journaled in said gimbal, a belt connecting said drive and driven members, and a drive wheel connected to said driven member and positioned adjacent said horizon arm, said drive wheel having a pin secured thereto and slidable in said slot to move said horizon arm upon rotation of said drive wheel for transmitting motion of said gimbal on said pitch axis to said indicating means.

2. An artificial horizon gyroscope comprising a frame, an
   attitude gimbal and roll axis bearing means supporting said gimbal on a roll axis in said frame, said bearing means having a generally central passageway therethrough,
   display means including roll indicating means connected via said bearing means to indicate motion of said gimbal in roll, a
   gyro rotor assembly and bearing means supporting said assembly on a pitch axis in said gimbal, said display means including
   pitch indicating means having a pitch transmitting drive connection comprising a
   horizon arm having an elongated slot therein and extending through said passageway and pivotally supported by said gimbal on a pivot axis located in the passageway of said roll axis bearing means and transverse to said passageway, a
   belt-and-pulley arrangement operable in response to pitch motion of said gimbal, and a
   drive wheel having a pin secured thereto and connected to said belt-and-pulley arrangement, said pin being engageable in said slot to transmit pitch information to said indicating means.

3. An artificial horizon gyroscope comprising a frame, an
   attitude gimbal and roll axis bearing means for suspending said gimbal on a roll axis in said frame, said bearing means having a generally central passageway therethrough,
   means for indicating roll and pitch information, said indicating means connected to said roll axis bearing means to respond to the motion of said gimbal in roll, a
   gyro rotor assembly and bearing means supporting said assembly on a pitch axis in said gimbal, and
   means including a horizon arm having an elongated slot at one end thereof and extending through said passageway and having a pivot in said roll axis bearing means and transverse to said passageway, a belt-and-pulley arrangement connected to said gyro rotor assembly, and a drive wheel positioned adjacent said horizon arm and having a pin secured thereto and slidable in said slot and connected to said belt-and-pulley arrangement for transmitting pitch motion of said gimbal.

* * * * *